(12) United States Patent
Oishi et al.

(10) Patent No.: US 7,577,219 B2
(45) Date of Patent: Aug. 18, 2009

(54) APPARATUS FOR COMMUNICATIONS

(75) Inventors: Syouji Oishi, Kawasaki (JP); Takanori Iwamatsu, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 566 days.

(21) Appl. No.: 11/346,176

(22) Filed: Feb. 3, 2006

(65) Prior Publication Data

US 2006/0176990 A1 Aug. 10, 2006

(30) Foreign Application Priority Data

Feb. 4, 2005 (JP) ............................. 2005-029493

(51) Int. Cl.
*H04L 27/06* (2006.01)

(52) U.S. Cl. ................... 375/344; 375/261; 375/327; 375/354; 455/182.2; 455/192.2; 455/214

(58) Field of Classification Search ............... 375/260, 375/261, 269, 272, 278, 326, 327, 329, 334, 375/344, 354, 355, 371; 455/182.1, 182.2, 455/192.1, 192.2, 214
See application file for complete search history.

(56) References Cited

U.S. PATENT DOCUMENTS

| | | | |
|---|---|---|---|
| 5,309,484 A | * | 5/1994 | McLane et al. ............. 375/354 |
| 5,872,818 A | | 2/1999 | Choi |
| 6,034,564 A | * | 3/2000 | Iwamatsu ................... 329/306 |
| 6,208,481 B1 | | 3/2001 | Spurbeck et al. |
| 7,054,088 B2 | * | 5/2006 | Yamazaki et al. ............ 360/65 |
| 7,098,821 B2 | * | 8/2006 | Husted et al. ................ 341/61 |
| 7,333,579 B2 | * | 2/2008 | Hwang ....................... 375/355 |

FOREIGN PATENT DOCUMENTS

EP 0 748 118 A2 12/1996

OTHER PUBLICATIONS

McLane, P.J., Filter Coefficient Interpolated Timing Recovery in Sampled Coherent PSK Receivers, IEEE, Dec. 6, 1992, pp. 472-478, vol. 1, New York, USA.

* cited by examiner

*Primary Examiner*—Dac V Ha
(74) *Attorney, Agent, or Firm*—Arent Fox LLP

(57) ABSTRACT

An apparatus for communications includes, a front processor for outputting a digital formatted base band signal with quadrature demodulating a modulated signal; an interpolation processor for interpolating to adjust a phase error in accordance with sampling timing on the basis of the base band signal outputted from the front processor and for creating and outputting a base band signal synchronized with the sampling timing; and a back processor for wave-shaping the base band signal outputted from the interpolation processor and for outputting. And the apparatus changes tap coefficients which are supplied to an FIR filter in the interpolation processor on the basis of the modulated signal inputted therein, and can appropriately control the bandwidth characteristic of interpolators.

17 Claims, 13 Drawing Sheets

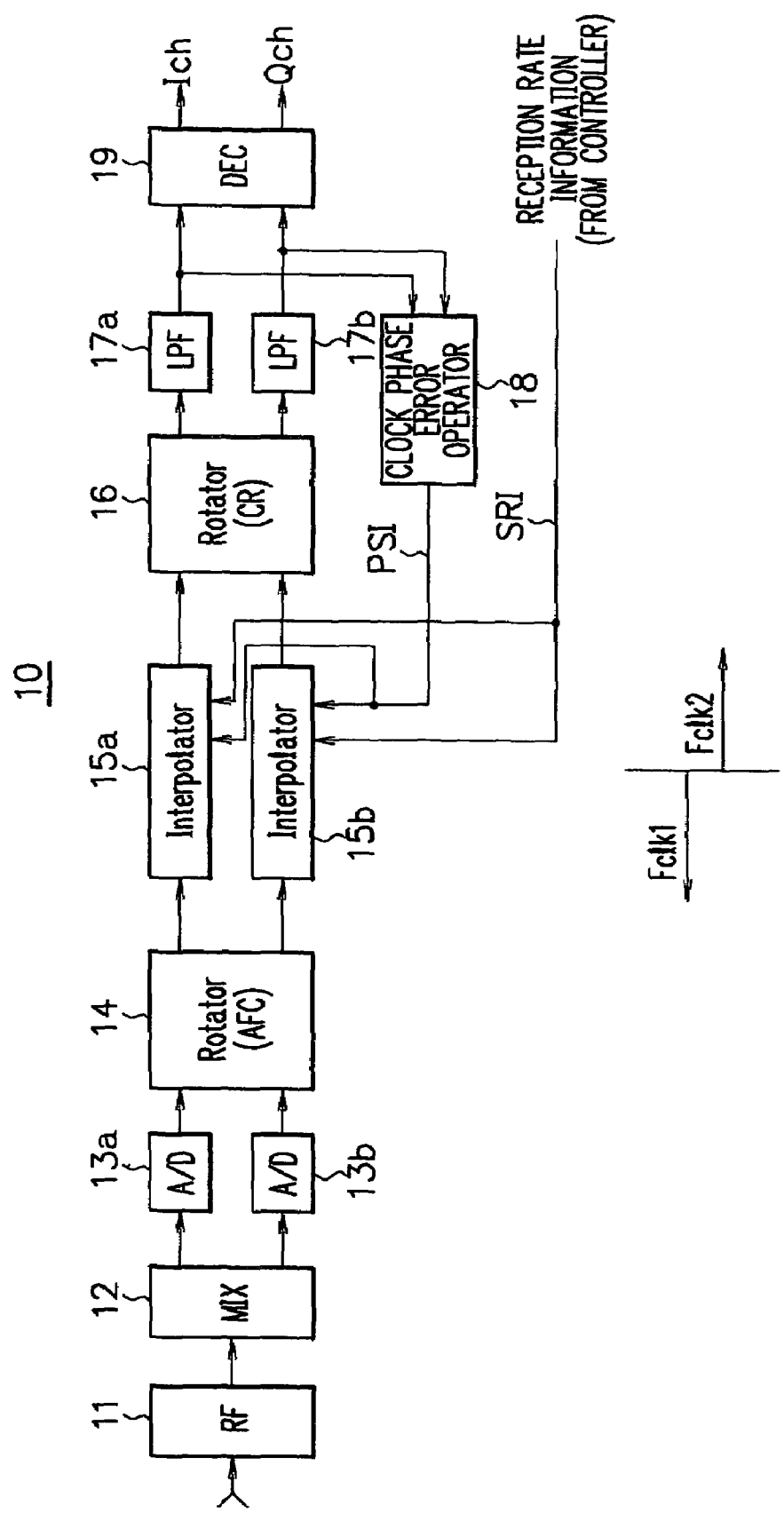

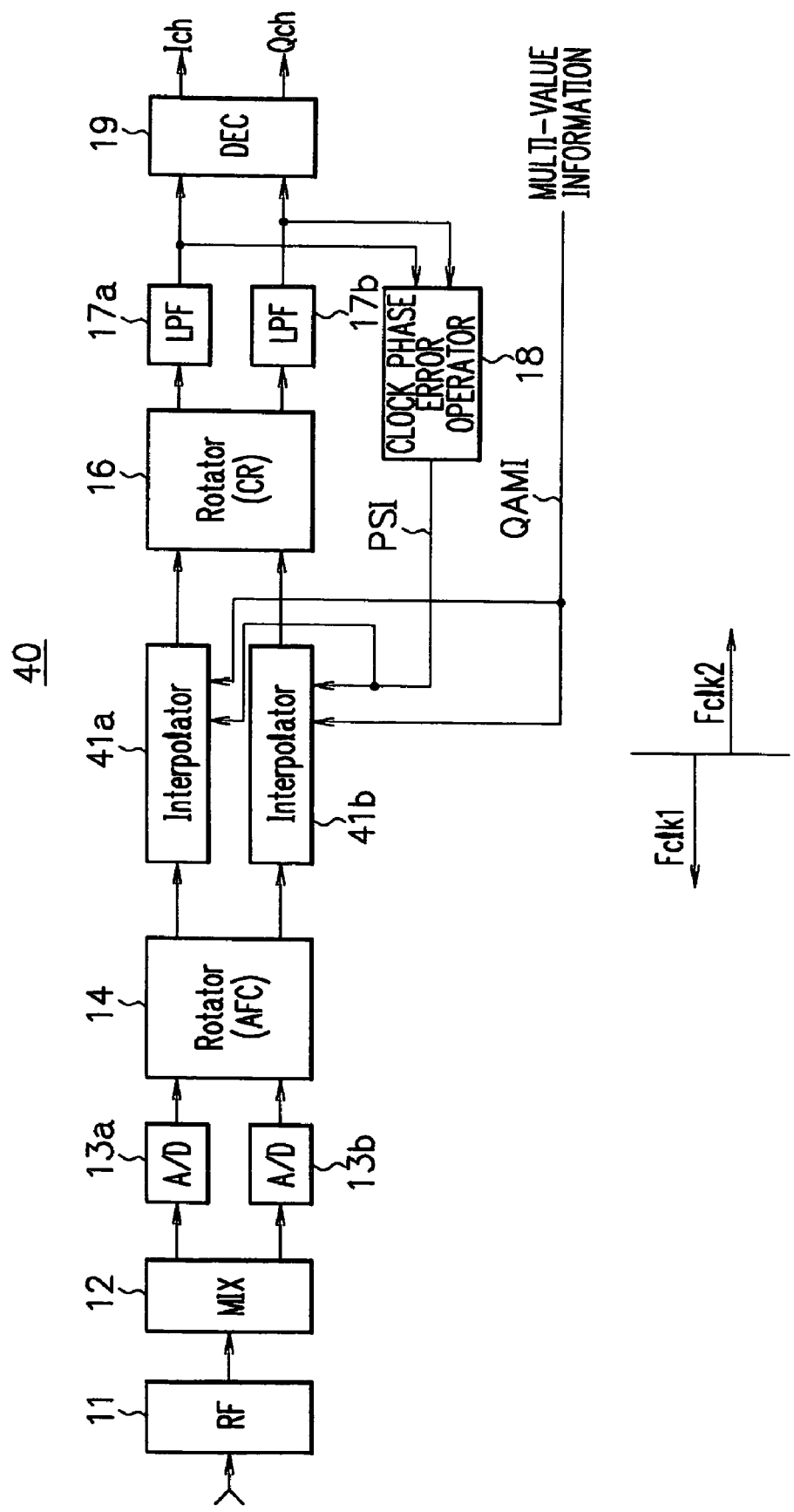

F I G. 6
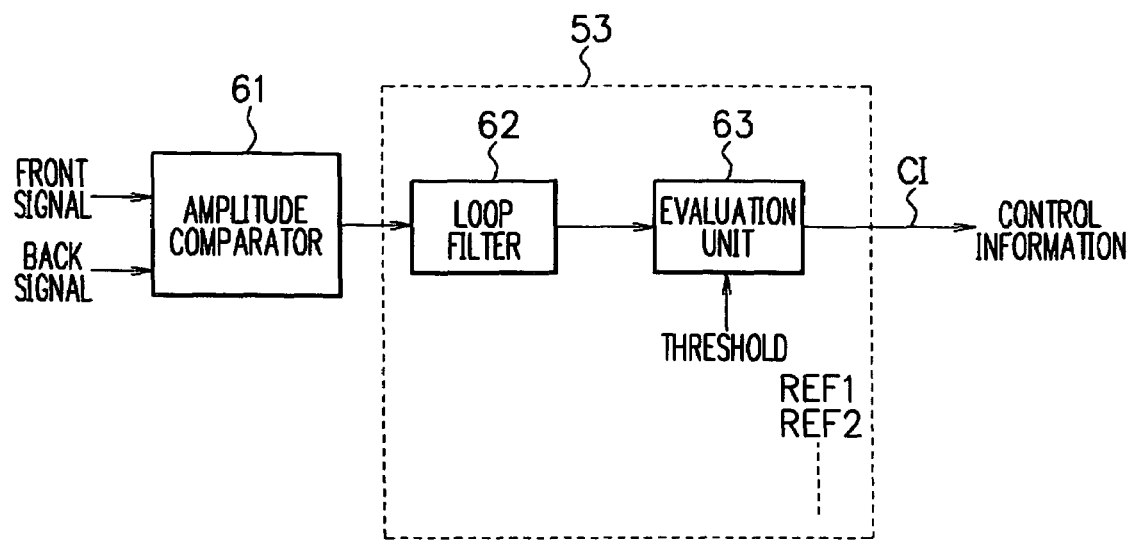

F I G. 8
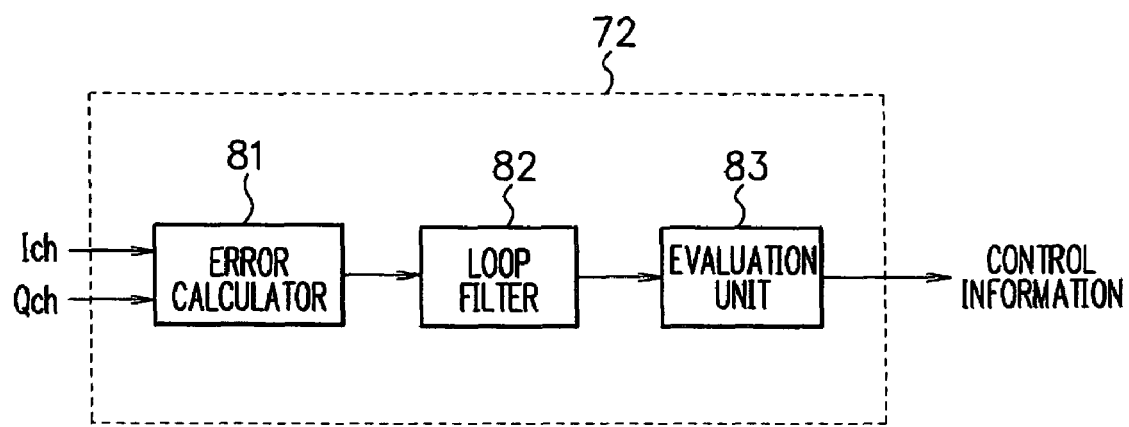

F I G. 10
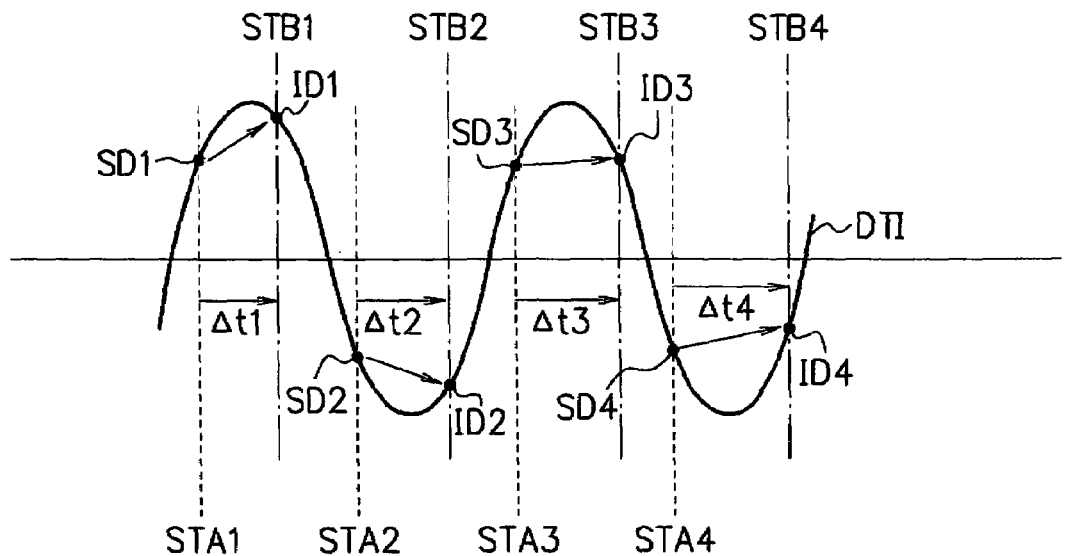

F I G. 15
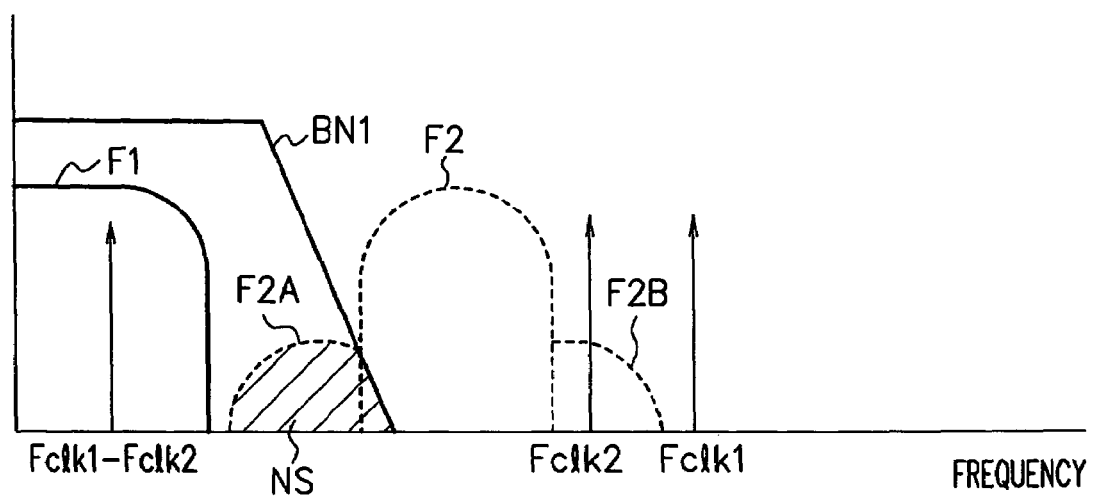

APPARATUS FOR COMMUNICATIONS

CROSS-REFERENCE TO RELATED APPLICATIONS

This application is based upon and claims the benefit of priority from the prior Japanese Patent Application No. 2005-029493, filed on Feb. 4, 2005, the entire contents of which are incorporated herein by reference.

BACKGROUND OF THE INVENTION

1. Field of the Invention

The present invention relates to an apparatus for communications, in particular, an apparatus for communications preferably using for a demodulation apparatus demodulating signals quadrature modulated.

2. Description of the Related Art

The quadrature amplitude modulation/demodulation is known as modulation/demodulation technology, which is used for signal conveyance in the communications such as CATV (cable television), satellite communications, multi-channel radio communications. FIG. 9 is a block diagram showing a configuration of a demodulator for demodulating quadrature amplitude modulation wave (modulated signal) in the prior art. As shown in FIG. 9, the demodulator is comprised of an RF unit 11, a MIX unit 12, A/D converters 13$a$, 13$b$, a rotator (AFC: Auto Frequency Control) 14, interpolators 91$a$, 91$b$, a rotator (CR: Carrier Recovery) 16, low pass filters (LPFs) 17$a$, 17$b$, a clock (CLK) phase error operator 18, and a decoder 19.

A modulated signal inputted from a cable or an antenna is performed for frequency conversion in the RF unit 11, so that its frequency is converted into the frequency possibly to demodulate. Subsequently, at the MIX unit 12, the signal is quadrature demodulated into base band signals as I/Q axes (hereafter, I axis is called as "I channel", Q axis is called as "Q channel"), which are digitized by the A/D converters 13$a$, 13$b$.

That is, the modulated wave, which is frequency converted by the RF unit 11, is quadrature demodulated into the signals corresponding to the phase axes of I channel as in-phase and Q channel as quadrature-phase, and analog formatted I channel and Q channel signals are outputted. The analog formatted I channel signal is converted into a digital formatted I channel signal by the A/D converter 13$a$, and similarly, the analog formatted Q channel signal is converted into a digital formatted Q channel signal by the A/D converter 13$b$.

In addition, the A/D converters 13$a$, 13$b$ may be arranged different locations from those in FIG. 9 depending upon a processing method. For example, if they are arranged in front of the quadrature demodulation i.e. MIX unit 12, the quadrature demodulation within the MIX unit 12 will become digital process.

The digital data of I/Q channels respectively which are outputted from the A/D converters 13$a$, 13$b$ are synchronized with carrier. This process is performed by shifting frequency in the rotators 14 and 16; roughly adjusting of coarse adjustment in the rotator (AFC) 14 and perfectly synchronizing of fine adjustment in the rotator (CR) 16. However, if the deviation of frequency is small, the process in the rotator (AFC) 14 may be omitted.

Since sampling in the A/D converters 13$a$ and 13$b$ is performed by using clock signal Fclk1 a synchronized to clock signal Fclk2 which is synchronized with clock signal of the transmission side, in order to restore digital data from the demodulated base band signals of I/Q channels, it is necessary to provide synchronization for sampling timing, which is generally called clock synchronization. FIG. 9 illustrates a configuration which is not for synchronization between the clock signal Fclk1 of sampling timing and data, but for synchronization through adjusting phase of data, and which creates a signal of a phase position obtaining data thereof, with an interpolation process through the interpolators 91$a$ and 91$b$ in order to synchronize the phase of the data. The created data become those synchronizing with the timing Fclk2, which is synchronized with the clock signal of the transmission side.

The base band signals of I/Q channels phase adjusted by the interpolators 91$a$ and 91$b$ are finally synchronized with the carrier by the rotator (CR) 16, and is wave-shaping through low pass filters (LPFs) 17$a$ and 17$b$, which are called roll-off filters; thereby signals are created. In general, because of processing such as error correcting and framing on the digital data, they will be decoded by the decoder (DEC) 19 as necessary.

The interpolating operation through the interpolators 91$a$ and 91$b$ shown in FIG. 9 will be described, referring to FIG. 10. In FIG. 10, DTI is input data, which is a sine wave in the figure for easy understanding of it. STA1 to STA4 shown by broken lines are sampling timings for the input data DTI based on the clock signal Fclk1, and STB1 to STB4 shown by one doted chain lines are original sampling timings based on the clock signal Fclk2.

In order to obtain signals at positions where are original sampling timings from the signals sampled by the A/D converters 13$a$ and 13$b$, original data sequence ID1 to ID4 at desirable sampling timings STB1 to STB4 are calculated and produced, from each of output data sequence SD1 to SD4 of the A/D converters 13$a$ and 13$b$ at sampling timings STA1 to STA4. Wherein, information relating to shifting phases Δt1 to Δt4 are outputted as phase error information PSI from the clock phase error operator 18 shown in FIG. 9.

FIG. 11 is a block diagram showing a configuration of the clock phase error operator 18. The clock phase error operator 18 comprises a clock phase error extractor 111, a phase comparator (PD) 112, a loop filter (LPF) 113, and an oscillator (NCO) 114.

A phase error is extracted from inputted I/Q channel data through the clock phase error extractor 111. The extracted phase error is compared with output timing of the oscillator 114 by the phase comparator 112. With processing of the clock phase error extractor 111 and the phase comparator 112, the phase error Δt is calculated.

Then, the comparison result at the phase comparator 112 is integrated (smoothed out) by the loop filter 113, whereby the oscillator 114 is controlled on the basis of the integration result. That is, a PLL (Phase Locked Loop) is composed of the phase comparator 112, the loop filter 113, and the oscillator 114. Though the oscillator 114 outputs the timing of clock signal Fclk2, actually it will inform the interpolators 91$a$ and 91$b$ about the phase difference from the clock signal Fclk1 as phase error information.

In the following patent document 1, detecting a symbol timing error from an output signal of a matching filter through a timing error detector, and changing tap coefficients of the matching filter based on the detected timing error information are described.

[Patent Document 1] U.S. Pat. No. 5,872,818

SUMMARY OF THE INVENTION

The object of the present invention is to provide an apparatus for communications, which can suitably control a band characteristic of interpolators on the basis of a receiving signal.

An apparatus for communications according to the present invention includes a front processor for outputting a digital formatted base band signal by quadrature demodulating a modulated signal, an interpolation processor for interpolating to adjust a phase error in accordance with sampling timing on the basis of the base band signal outputted from the front processor and for creating and outputting a base band signal synchronized with the sampling timing, and a back processor for wave-shaping the base band signal outputted from the interpolation processor and for outputting. The interpolation processor includes an FIR filter which controls tap coefficients supplying to the FIR filter on the basis of the modulated signal inputted therein.

According to the configuration as described above, it is possible to control a band characteristic of the FIR filter by supplying tap coefficients on the basis of the receiving modulated signal to the FIR filter.

BRIEF DESCRIPTION OF THE DRAWINGS

FIG. 1 is a block diagram showing an example of a configuration of a demodulator according to a first embodiment;

FIG. 4 is a block diagram showing an example of a configuration of a demodulator according to a second embodiment;

FIG. 6 is a block diagram showing a configuration of a controller according to the third embodiment;

FIG. 8 is a block diagram showing a configuration of a controller according to the fourth embodiment;

FIG. 10 is a diagram to explain an interpolating action through an interpolator;

FIG. 15 is a diagram to explain influence of an adjacent wave.

DETAILED DESCRIPTION OF THE PREFERRED EMBODIMENTS

Hereafter, embodiments of the present invention will be described in accordance with the accompanying drawings.

Figure 9:
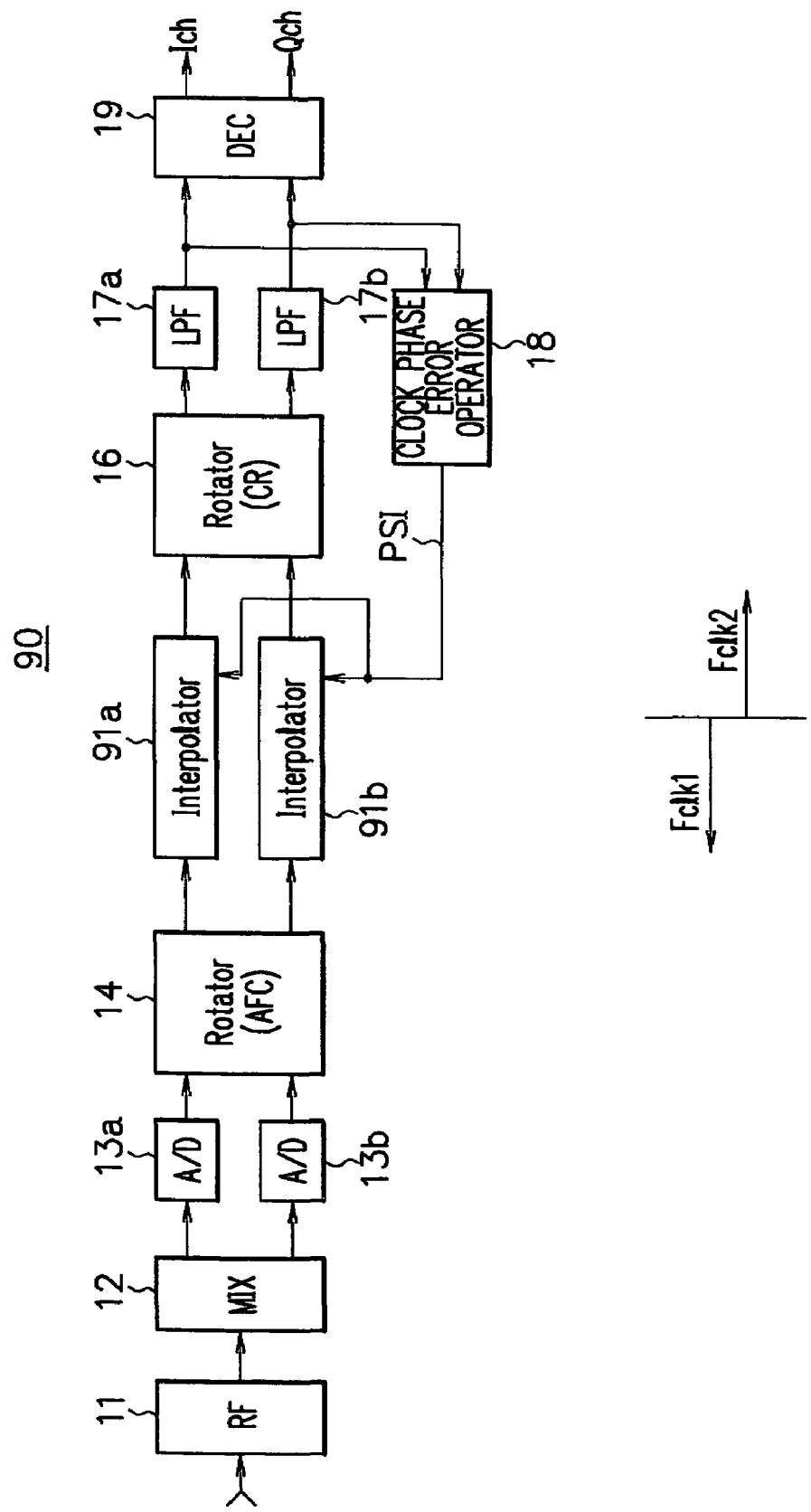
FIG. 9 is a block diagram showing a configuration of a demodulator in the prior art.
Figure 12A:
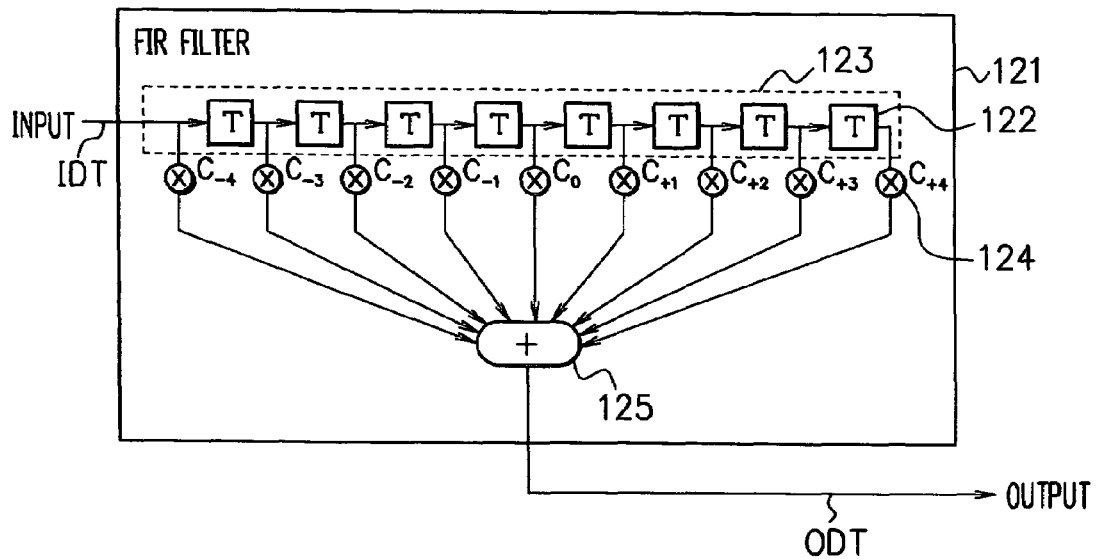
FIGS. 12A and 12B are diagrams showing a configuration of an interpolator within a demodulator in the prior art.
Figure 12B:
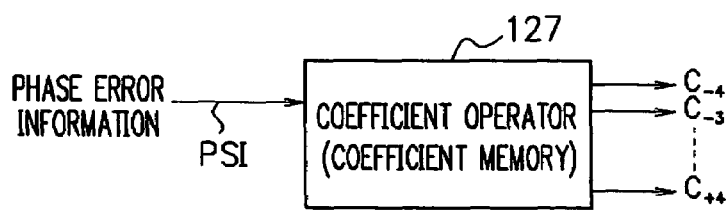

Each of the interpolators shown in FIG. 9 is composed of an FIR (finite impulse response) filter 121 shown in FIG. 12A and a coefficient operator (coefficient memory) 127 shown in FIG. 12B which outputs coefficients (tap coefficients) $C_i$ ($i$ is subscript; equal to an integer of minus 4 to plus 4) to an FIR filter 121.

As shown in FIG. 12A, the FIR filter 121 is composed of a group of registers 123 which is composed of a plurality of registers 122 being cascade connection and to which input signal data IDT are inputted; multipliers 124 each of which multiplies the output of each register 122 (or input signal data IDT) by each tap coefficient $C_i$; and an adder 125 which adds multiplying results of each multiplier 124 and outputs it as output signal data ODT. In FIG. 12A, an FIR filter 121 having 9 taps is illustrated as an example.

The FIR filter 121, which holds input signal data IDT during a plurality of time, treats each data as an impulse, and changes the phase by controlling tap coefficients $C_i$ multiplied by each impulse. In other words, with appropriately controlling the tap coefficients $C_i$, the FIR filter 121 can output a signal which likely shifts the phase for the input signal data IDT as the output signal data ODT. These coefficients $C_i$ can be calculated from the impulse response waveform.

That is, the FIR filter 121 has an impulse response as a filter limiting a band (for example, low pass filter: LPF), and outputs a value, which is from a timing position of clock signal Fclk1 to a timing position of clock signal Fclk2 of the impulse response, as coefficients $C_i$ through the coefficient operator 127. This shows that the coefficients $C_i$ of the FIR filter 121 change from moment to moment corresponding to the change of the phase error information PSI inputted to the interpolators.

The coefficient operator 127 outputs the tap coefficients $C_i$ according to the phase error information PSI which is inputted. The coefficient operator 127 has previously stored a table including the tap coefficients $C_i$ corresponding to the amount of the phase errors $\Delta t$, on the basis of the phase errors indicated by the phase error information PSI, reads and outputs tap coefficients $C_i$ corresponding to the phase errors. In addition, the coefficient operator 127 may be configured to calculate the tap coefficients $C_i$ with calculation on an as-needed basis of the input phase error information PSI.

Figure 13:
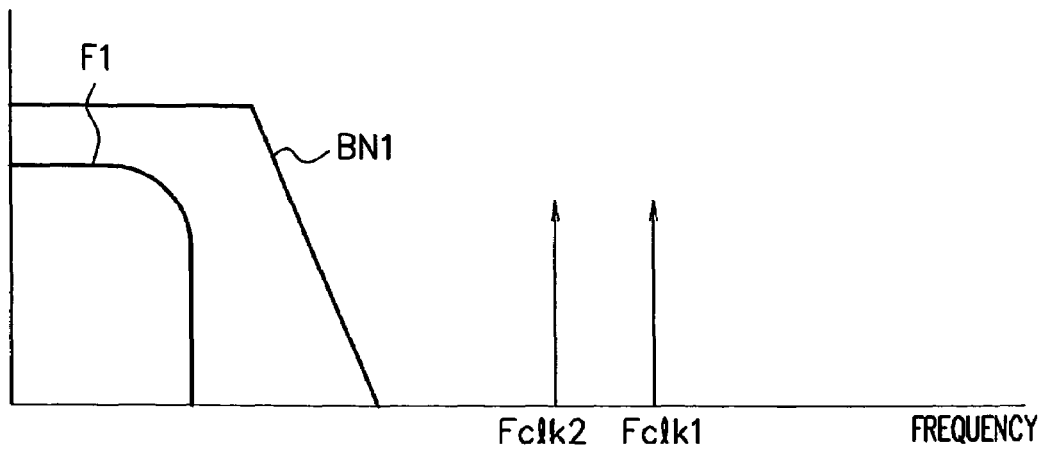
FIG. 13 is a diagram to explain a filter band of an interpolator.

It will be described about an operation of the interpolators (FIR filter 121) in a frequency domain, in other words, about the operation as a filter. FIG. 13 is a diagram to explain a filter band of the interpolator. In FIG. 13, the interpolator operates as a filter limiting band, and herein operates as a low pass filter (LPF).

In FIG. 13, F1 is a band of a base band signal of I channel or Q channel inputting to the interpolator, and BN1 is a band of the interpolator (passing band as filter). Further, Fclk1 and Fclk2 respectively illustrate a frequency of the sampling clock in the A/D converter and a clock frequency of the transmission side (actually desirable sampling timing).

The filter characteristic of the interpolator is preferably a conveyance characteristic without affecting to the base band signal of input I channel or Q channel, as shown in FIG. 13, the band BN1 of the interpolator is generally a wider band characteristic than that of the band F1 of the base band signal. With this operation, it is possible to process the interpolating operation.

Figure 14:
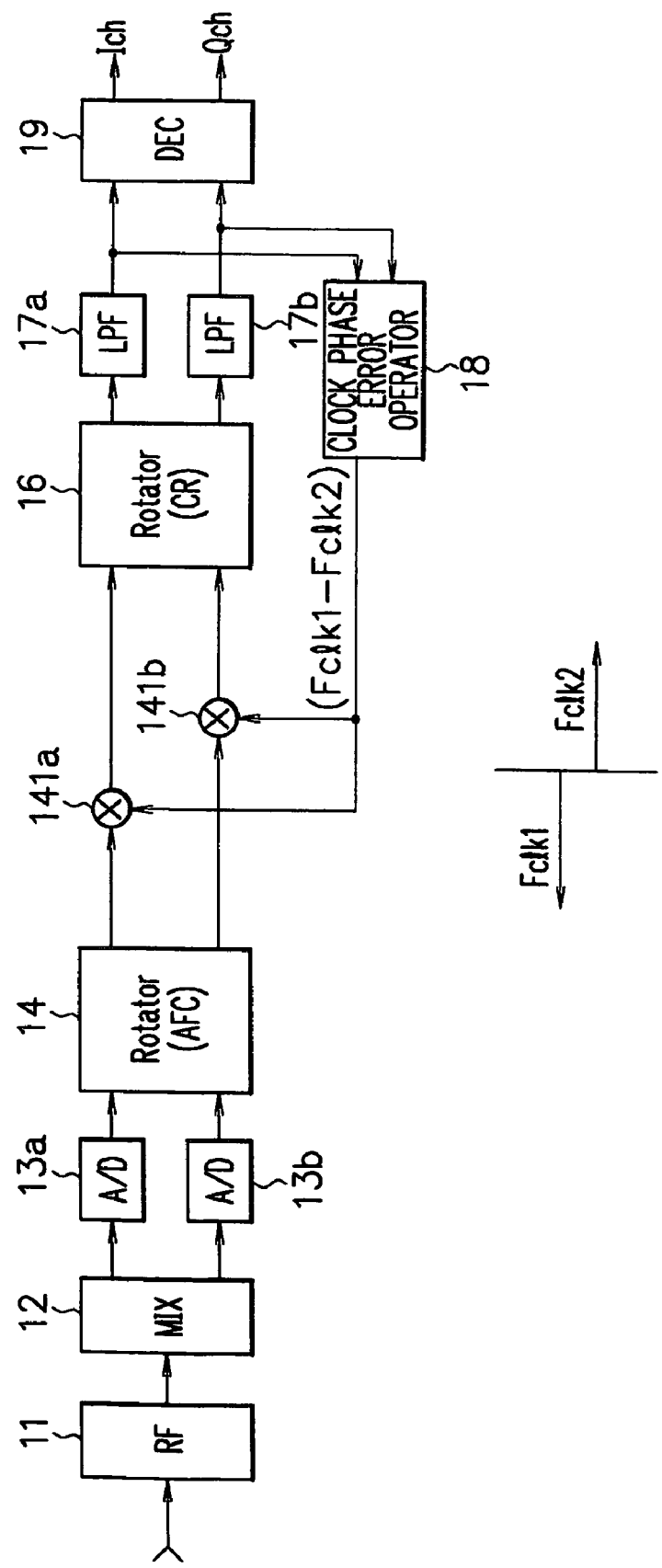
FIG. 14 is a conceptual view of an interpolator within a demodulator in the prior art.

Though the interpolator operates as the low pass filter, also operates as a modulator (modulating operation), because the tap coefficients $C_i$ change from moment to moment as described above. FIG. 14 is a conceptual view to explain the modulating operation through the interpolator (FIR filter 121). In FIG. 14, the blocks having functions being identical to those of the blocks shown in FIG. 9, are indicated the same numbers/characters, so that the overlapped description will be omitted.

As shown in multipliers 141a, 141b in FIG. 14, the interpolators perform not only the operation as the low pass filter but also the operation as the multiplying operation at the frequency (Fclk1-Fclk2) for the base band signal of input I/Q channels. This operation is, as shown in FIG. 15, the same operation of modulating the input signal with the frequency (Fclk1-Fclk2) in the frequency axis.

AS shown in FIG. 15, it would be good that the signal inputted to the interpolator is only the base band signal (band F1) of the receiving I/Q channels, however in many cases, a signal (band F2) of an adjacent channel remains. The signal of the adjacent channel means a signal being adjacent to the waveform of the desirable channel when a plurality of waveforms are arranged in the received high-frequency signal, because, in many cases, multi-channel signals are transmitted in such as the CATV, satellite communications, and multi-radio communications, such signals of the adjacent channels will become the interference source in the waveform of the desirable channel.

This signal of the adjacent channel is also modulated by the interpolator. Consequently, as shown in FIG. 15, signals modulated by the in terpolator appear in bands F2A and F2B which are lower and upper frequencies of the signal band F2 of the adjacent channel. However, since a band limitation is also simultaneously effected by the operation as the low pass filter actually, while the components of the higher frequency (the components of the band F2 and F2B) are cut off from the right signal part of the adjacent channel being out of the passing band BN1, the components of the modulated signal (the components of the band F2A) relating to the adjacent channel within the passing band BN1 are not cut off, which are transferred to the latter stage without being processed, and which may probably become the noise source. The components transferred to the latter stage among those of the adjacent channel illustrate as the hatching area NS in FIG. 15.

It is considered that the interference owing to the signal components of this hatching area NS affects the base band signal of I/Q channels of the desirable receiving channel. In general, since the signal components of the hatching area NS are removed by roll-off filters (LPFs) 17a and 17b positioned at the latter stage shown in FIG. 9, it is considered that the signal components of the hatching area NS do not affect the desirable receiving channel finally. However, the interference components affect the dynamic range until input terminals of the roll-off filters (LPFs) 17a and 17b, therefore, it causes quality to reduce.

In particular, if the level of the signal relating to the adjacent channel is very large, the signal level will exceed the possible range to process owing to the noise of the hatching area NS, it will become a serious problem such that performing the process in the latter stage is impossible.

In order to solve the problem described above, a method will be considered which makes the band width BN1 of the interpolator narrow as the same order of that of the roll-off filters 17a and 17b in the latter stage, however, when the band width BN1 is made narrow without study, the following problem occurs. At the time of performing a process in the interpolator, frequency shift components exist in the input signal owing to not perfect synchronization of the carrier with only coarse adjustment through the rotator (AFC) 14. If the frequency shift components are cut off through the interpolator by making the bandwidth BN1 narrow, the deterioration of the characteristic will occur.

Accordingly, it is preferable that the band width of the interpolator should be determined intending to optimum, with consideration of the affect owing to the adjacent channel and the attenuation of the self-wave owing to carrier shift. Therefore, a demodulator applied an apparatus for communications according to an embodiment of the present invention explaining later is a modulator which can suitably control the band width of the interpolator corresponding to an input modulated signal.

A First Embodiment

Initially, a first embodiment according to the present invention will be described.

FIG. 1 is a block diagram showing an example of a configuration of a demodulator 10 being provided in the apparatus for communications according to the first embodiment of the present invention.

The demodulator 10 includes an RF (frequency converter) unit 11, a MIX (mixer) unit 12, A/D (analog-to-digital) converters 13a and 13b, a rotator (AFC: Auto Frequency Control) 14, interpolators 15a and 15b, a rotator (CR: Carrier Recovery) 16, low pass filters (LPFS) 17a and 17b, a clock phase error operator 18, and a decoder 19.

The RF unit 11 performs frequency conversion to a modulated signal inputted therein, and converts its frequency into a demodulatable frequency. For example, the RF unit 11 converts a demodulated frequency that is inputted with 1 to 2 GHz frequency into a frequency with around 500 MHz. The MIX unit 12 quadrature demodulates (separates) the modulated wave performed frequency conversion through the RF unit 11 into base band signals corresponding to the phase axes of I channel and Q channel.

The A/D converters 13a and 13b digitally covert analog formatted base band signals of I/Q channels outputted from the MIX unit 12 with sampling on the basis of clock signal Fclk1. In addition, the locations of the A/D converters 13a and 13b are not limited to this case, which may be arranged different locations depending upon a processing method. For example, if they are arranged in front of the MIX unit 12, the quadrature demodulation within the MIX unit 12 will become a digital process. Further, the clock signal Fclk1 and the clock signal Fclk2 are asynchronous, the clock signal Fclk2 is synchronous with a clock signal of a transmission side.

The rotator (AFC) 14 and the rotator (CR) 16 make the carriers synchronous with digital data of the I/Q channels. The rotator 14 (AFC) roughly adjusts the frequency by coarse adjustment and the rotator (CR) 16 performs fine adjustment for perfect synchronization. In addition, if the deviation of the frequency is small, the performance through rotator (AFC) 14 may be omitted.

To the interpolators 15a and 15b, phase error information PSI is inputted from the clock phase error operator 18, and also reception rate information SRI is inputted from a receiving controller (not shown). The interpolators 15a and 15b are controlled on the basis of the phase error information PSI, and the reception rate information SRI, etc., and in order to restore digital data from the demodulated base band signals of the I/Q channels, the interpolators 15a and 15b perform synchronism, which is generally called as clock synchronism, for the sampling timing. Concretely, the interpolators 15a and 15b, as described by using FIG. 10, adjust the phase of data on the basis of the data of the I/Q channels performed sampling by using the clock signal Fclk1, and create data through calculation at the sampling timing by using the clock signal Fclk2 synchronized with the clock signal of the transmission side.

The low pass filters (LPFs) 17a and 17b, which are so called roll-off filters, perform wave-shaping for the base band signals of the I/Q channels where the carriers are synchronized by the rotator (CR) 16. The decoder 19 performs processing such as error correcting and framing performed on digital data as necessary, also decodes and outputs it as the data of the I/Q channels.

Figure 11:
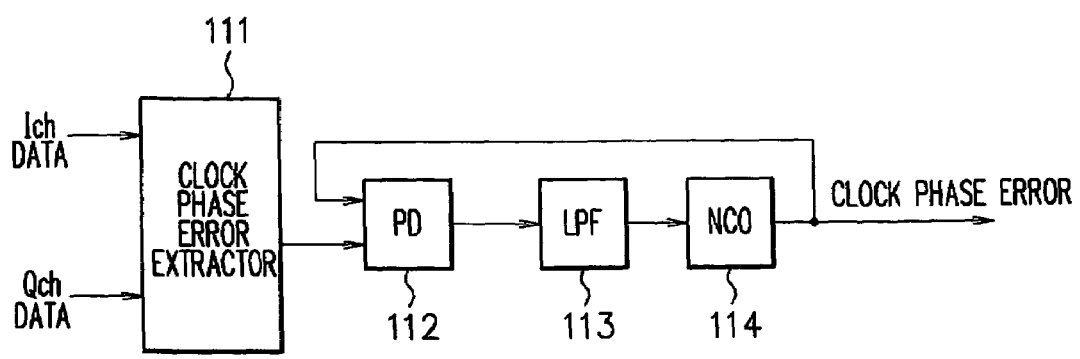
FIG. 11 is a block diagram showing a configuration of a clock phase error operator.

The clock phase error operator 18 acquires the phase difference between the clock signal Fclk1 and the clock signal Fclk2, in other words, the difference between the actual sampling timing and the desirable sampling timing with calculation. And, the clock phase error operator 18, on the basis of the calculation result, outputs the phase difference between clock signal Fclk1 and clock signal Fclk2 as the phase error information PSI to the interpolators 15a and 15b. Incidentally, the configuration of the clock phase error operator 18 is the same configuration as shown in FIG. 11 described above, so that the detail description of it will be omitted.

Figure 2A:
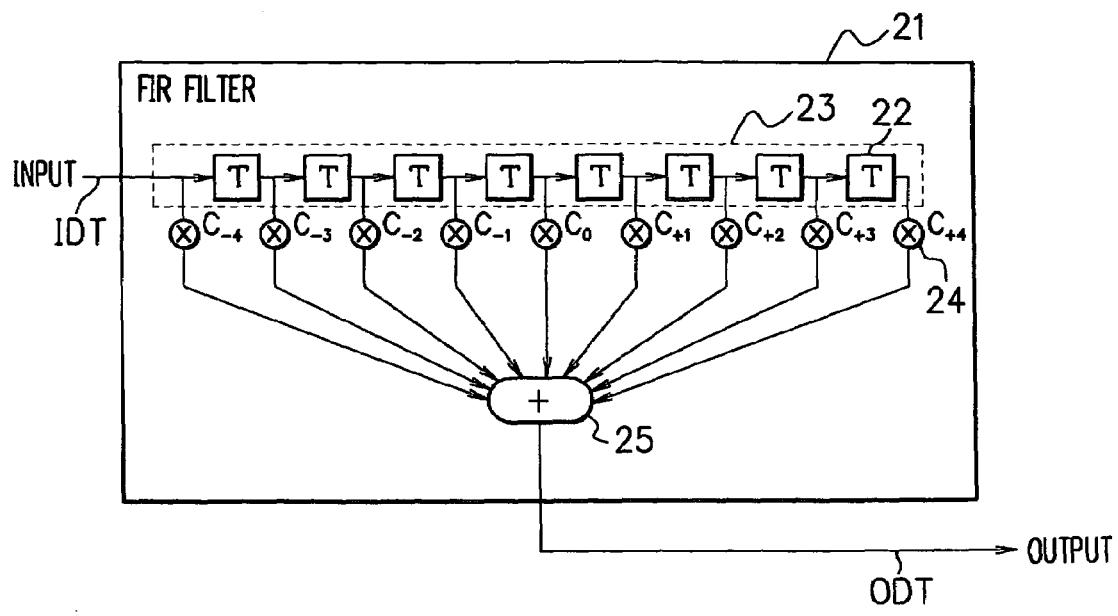
FIGS. 2A and 2B are diagrams showing an example of a configuration of an interpolator.
Figure 2B:
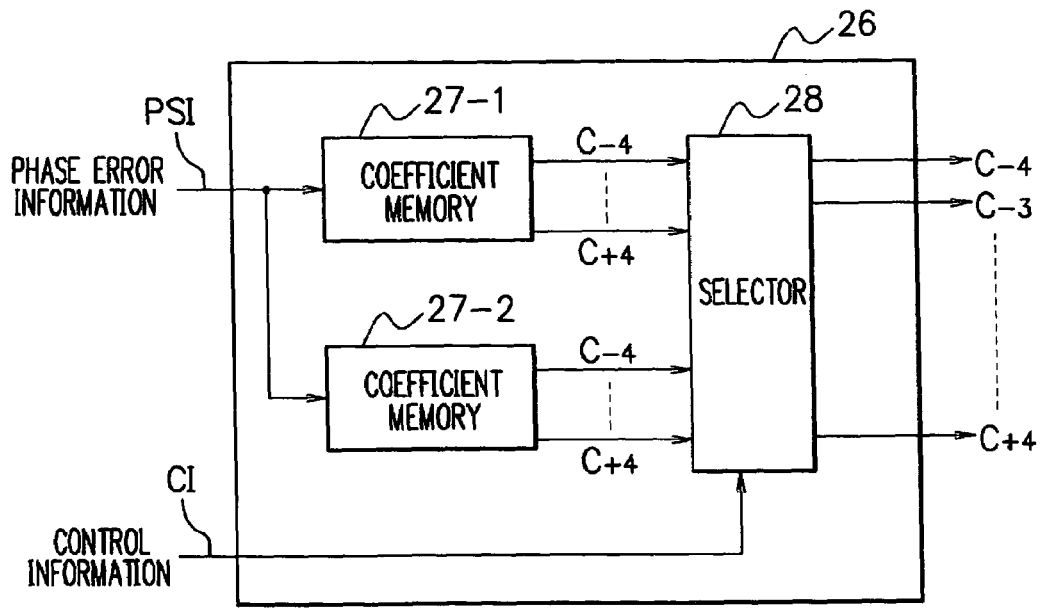

FIGS. 2A and 2B are diagrams showing an example of the configuration of the interpolators 15a and 15b according to the present embodiment. Each of the interpolators 15a and 15b includes an FIR (finite impulse response) filter 21 as shown in FIG. 2A, and a coefficient operator 26 as shown in FIG. 2B.

The FIR filter 21, as shown in FIG. 2A, includes a group of registers 23 composed of a plurality of registers 22 being cascade connection, multipliers 24 each of which multiplies an output of each register 22 (or input signal data IDT) by each coefficient (tap coefficient) Ci (i is subscript; equal to an integer of minus 4 to plus 4), and an adder 25 which adds multiplying results of each multiplier 24 and outputs it as output signal data ODT. The FIR filter 21 is the same FIR filter 121 as shown in FIG. 12A, so that the detail description of it will be omitted. In addition, though FIG. 2A illustrates an example of the FIR filter 21 having 9 taps, it is not limited to this, the number of taps is arbitrary.

The coefficient operator 26 shown in FIG. 2B includes coefficient memories 27-1 and 27-2, and a selector 28.

The coefficient memories 27-1 and 27-2 are correspondingly provided each state which is indicated by control information CI, that is, one coefficient memory is provided corresponding to one state. Each of the coefficient memories 27-1 and 27-2 has previously stored a tap coefficient table in which tap coefficients Ci corresponding to the amount of a phase error are defined, and outputs tap coefficients Ci corresponding to a phase error indicated by an inputted phase error information PSI to the selector 28.

To the selector 28, the tap coefficients Ci are supplied from each of the coefficient memories 27-1 and 27-2, and the selector 28 selects the tap coefficients Ci from one of them on the basis of the control information CI, and outputs them to the FIR filter 21.

That is, the coefficient operator 26 according to the present embodiment shown in FIG. 2B selects a set of tap coefficients Ci based on the input phase error information PSI and control information CI, and supplies the tap coefficients Ci corresponding to the selected phase error information and control information to the FIR filter 21. In this first embodiment, the control information CI is reception rate information SRI which is inputted from a receiving controller not shown.

In addition, though FIG. 2B illustrates one example of the coefficient operator 26 including two coefficient memories 27-1 and 27-2, it is not limited to this, an arbitrary number of coefficient memories may be provided corresponding to the control information, etc. Further, instead of the configuration providing the plurality of coefficient memories, a configuration in which a memory area of a coefficient memory is divided into plural areas can be used. Furthermore, it may be configured to calculate the tap coefficients Ci with calculation on an as-needed basis of the input phase error information, the control information, etc.

Next, the operation will be described.

A modulated wave which is inputted from a cable or an antenna, after its frequency is converted into a demodulatable frequency by the RF unit 11, is quadrature demodulated into base band signals of I/Q channels by the MIX unit 12. Subsequently, they are converted into the digital formatted base band signals of the I/Q channels by the A/D converters 13a and 13b.

The base band signals of the I/Q channels digitized by the A/D converters 13a and 13b are performed for the rough frequency adjustment in order to synchronize with the carrier by the rotator (AFC) 14. Then, clock synchronism is performed with the phase adjustment in the interpolators 15a and 15b. Subsequently, the perfect synchronism is performed for the carrier through the fine adjustment of the frequency in the rotator (CR) 16. The phase adjustment in the interpolators 15a and 15b is performed by the FIR filter 21 where the tap coefficients Ci are supplied according to the phase error information PSI and the reception rate information SRI. The phase error information PSI is calculated by the clock phase error operator 18 at any time as described above, and is outputted based on the calculation result.

The base band signals of the I/Q channels which are finally synchronized with the carrier in the rotator (CR) 16, are wave-shaped by the roll-off filters 17a and 17b, and are decoded by the decoder 19, and outputted.

In the first embodiment, symbol rate information (symbol frequency set signal) of a receiving channel is supplied to the interpolators 15a and 15b as the reception rate information SRI. The bandwidth (cut-off frequency) of the interpolators 15a and 15b is controlled by changing the tap coefficients Ci of the FIR filter 21 which are supplied by the coefficient operator 26 according to the symbol rate (symbol frequency) indicated by the symbol rate information.

Since the bandwidth of the transmitting signal changes with the symbol rate, changing the bandwidth of the interpolators 15a and 15b according to the symbol rate and changing that according to the bandwidth of the transmitting signal are the same. That is, in the first embodiment, the bandwidth of interpolators 15a and 15b is controlled and changed according to the bandwidth of the transmitting signal.

In addition, in the case of the normal receiving, the symbol rate (the bandwidth of the transmitting signal) of a receiving channel is previously known, and this information is included in the receiving controller not shown, etc. Accordingly, the symbol rate information supplying to the interpolators 15a and 15b can be created and outputted on the basis of the information included in the receiving controller, etc.

As described above, the bandwidth of the interpolators 15a and 15b preferably has a conveying characteristic without affecting the received signal, and is generally a wider band than that of the received signal. Thereby, as an example described in FIG. 3A, the bandwidth of the interpolators 15a and 15b is wider by a constant number of frequencies (e.g. 5 MHz) than the symbol rate (signal bandwidth).

Figure 3A:
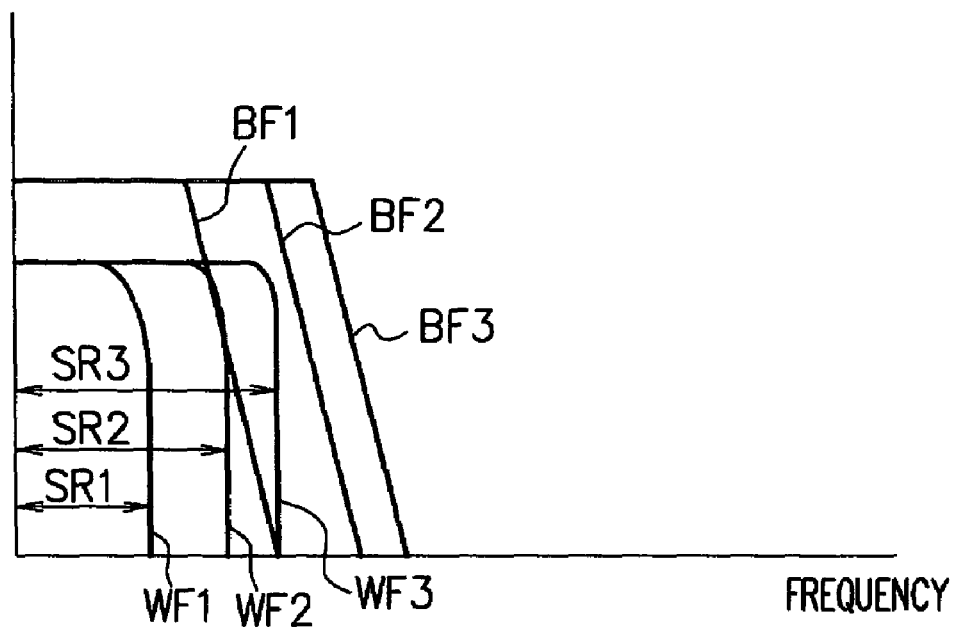
FIGS. 3A and 3B are diagrams showing examples of changing bandwidth of the interpolator.

FIG. 3A is a diagram showing a controlling example of the bandwidth of the interpolators 15a and 15b according to the present embodiment. In FIG. 3A, each of WF1, WF2 and WF3 indicates the band where each symbol rate is SR1, SR2, and SR3; and each of BF1, BF2, and BF3 indicates the bandwidth of interpolators 15a and 15b corresponding to each receiving signal band WF1, WF2, and WF3.

As shown in FIG. 3A, by controlling the bandwidth of the interpolators 15a and 15b according to the amount of the symbol rate i.e., the band of the receiving signal, for example, the bandwidth of the interpolators can be set to the bandwidth which is slightly wider than the band of the receiving signal and is hardly affected from the carrier shift, corresponding to the receiving signal. In addition, as shown in FIG. 3A, the tap coefficients $C_i$, by which each of the bandwidths BF1, BF2, and BF3 of the interpolators 15a and 15b is set, are previously stored into the coefficient memories included in the coefficient operator 26 of the interpolators 15a and 15b, so that they may appropriately be selected according to each symbol rate SR1, SR2, and SR3 indicated by the reception rate information SRI.

Figure 3B:
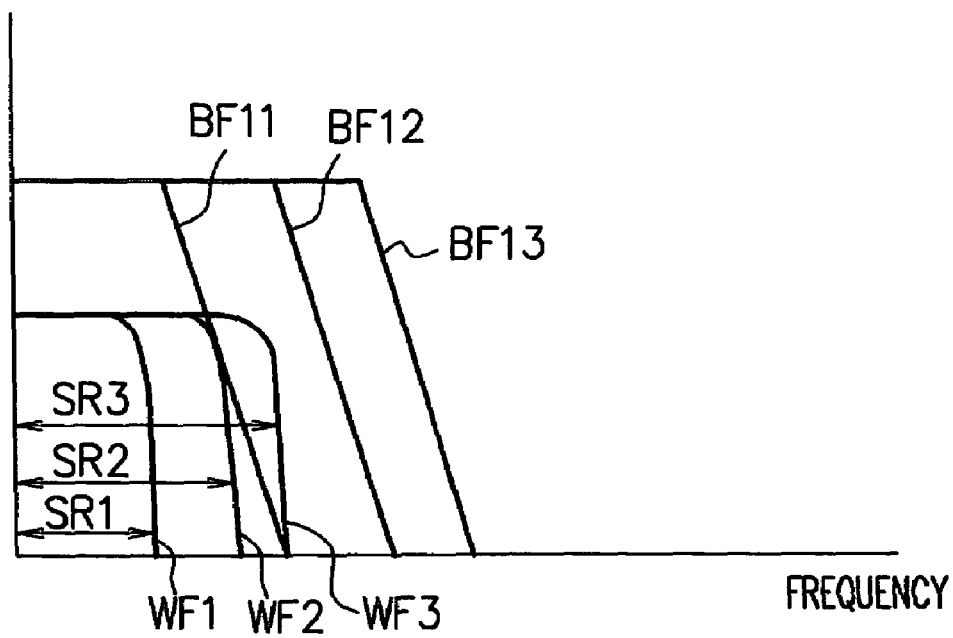

As described above, though the bandwidth of the interpolators 15a and 15b is set to be wider by the constant number of frequencies than the symbol rate (signal bandwidth), as an example shown in FIG. 3B, it can be wider by a constant ratio (e.g. 1.3 times) in comparison to the symbol rate (signal bandwidth). In this case also, symbol rate information (symbol frequency set signal) of a receiving channel may be supplied to the interpolators 15a and 15b as receive rate information, thus the bandwidth (cut-off frequency) of the interpolators 15a and 15b may be controlled by changing the tap coefficients $C_i$ of the FIR filter 21 which are supplied by the coefficient operator 26.

FIG. 3B is a diagram showing another controlling example of the bandwidth of the interpolators 15a and 15b according to the present embodiment. In FIG. 3B, each of WF1, WF2 and WF3 indicates the signal band where each symbol rate is SR1, SR2, and SR3; and each of BF11, BF12, and BF13 indicates the bandwidth of the interpolators 15a and 15b corresponding to each receiving signal band WF1, WF2, and WF3.

In this way, if the bandwidth of the interpolators 15a and 15b is set to be wider by k times (k is an arbitrary value) in comparison to the symbol rate (signal bandwidth), the bandwidth, for example, can be higher accuracy and have a better characteristic than being wider by the constant number of frequencies in the case such that the dynamic range of the symbol rate is wide.

As described above, in accordance with the first embodiment, the bandwidth of the interpolators 15a and 15b (FIR filter 21) can be controlled to a suitable bandwidth corresponding to the bandwidth of the receiving signal, by changing the tap coefficients which are supplied to the FIR filter 21 of the interpolators 15a and 15b according to the symbol rate information (bandwidth of receiving signal) of the receiving channel.

A Second Embodiment

Next, a second embodiment according to the present invention will be described.

FIG. 4 is a block diagram showing an example of a configuration of a demodulator 40 according to the second embodiment. In FIG. 4, the blocks having functions being identical to those of the blocks shown in FIG. 1, are indicated by the same numbers/characters, so that the overlapped description will be omitted. In FIG. 4, interpolators 41a and 41b are corresponding to the interpolators 15a and 15b shown in FIG. 1, and are configured as well as those in FIGS. 2A and 2B.

The demodulator 40 according to the second embodiment shown in FIG. 4, is different from the demodulator 10 according to the first embodiment shown in FIG. 1, with respect to the information inputting to the interpolators. In the second embodiment, multi-value information QAMI (QAM set information) is inputted from a receiving controller (not shown) to the interpolators 41a and 41b of the demodulator 40, instead of the reception rate information SRI.

The multi-value information QAMI becomes the control information CI for the interpolators 41a and 41b in the second embodiment. That is, in the second embodiment, the bandwidth (cut-off frequency) of the interpolators 41a and 41b is changed according to a multi-value relating to the quadrature amplitude modulation.

In this, the multi-value relating to the quadrature amplitude modulation is one of parameters to which error occurrence by causing the carrier shift or signal cut-off affects. In the quadrature amplitude modulation, distortion and/or noise strength differs depending upon the multi-value, as for the cut-off distortion of the self-wave with the carrier shift, its strength also differs depending upon the multi-value. As the multi-value is greater, the strength against the influence of noise, etc. from the adjacent channel decreases, for example, even if it sufficiently endures against the multi-value 4 of 4PSK, there is a possibility that it does not endure at all against the multi-value 256 of 256QAM.

For this reason, in the second embodiment, the bandwidth (cut-off frequency) of the interpolators 41a and 41b is controlled by changing the tap coefficients $C_i$ supplied to the FIR filter according to the phase error information PSI and the multi-value information QAMI. The tap coefficients $C_i$ supplied to the FIR filter are stored into each coefficient memory provided corresponding to each multi-value, the tap coefficients $C_i$ corresponding to the multi-value indicated by the multi-value information QAMI are supplied to the FIR filter, with appropriately exchanging the selector on the basis of the multi-value information QAMI. In addition, as described above, since, as the multi-value is greater, the strength decreases, so that as the multi-value is greater, the bandwidth (cut-off frequency) of the interpolators 41a and 41b is controlled to be narrower. That is, the bandwidth of the interpolators 41a and 41b is changed according to the multi-value, for intending to the relation that the bandwidth of the interpolators 41a and 41b is inversely proportional to the multi-value.

According to the second embodiment, the bandwidth of the interpolators 41a and 41b can be suitably controlled corresponding to the multi-value of the receiving signal, by changing the tap coefficients $C_i$ which are supplied to the FIR filter of the interpolators 41a and 41b according to the multi-value of the modulation system of the receiving signal.

A Third Embodiment

Next, a third embodiment according to the present invention will be described.

Figure 5:
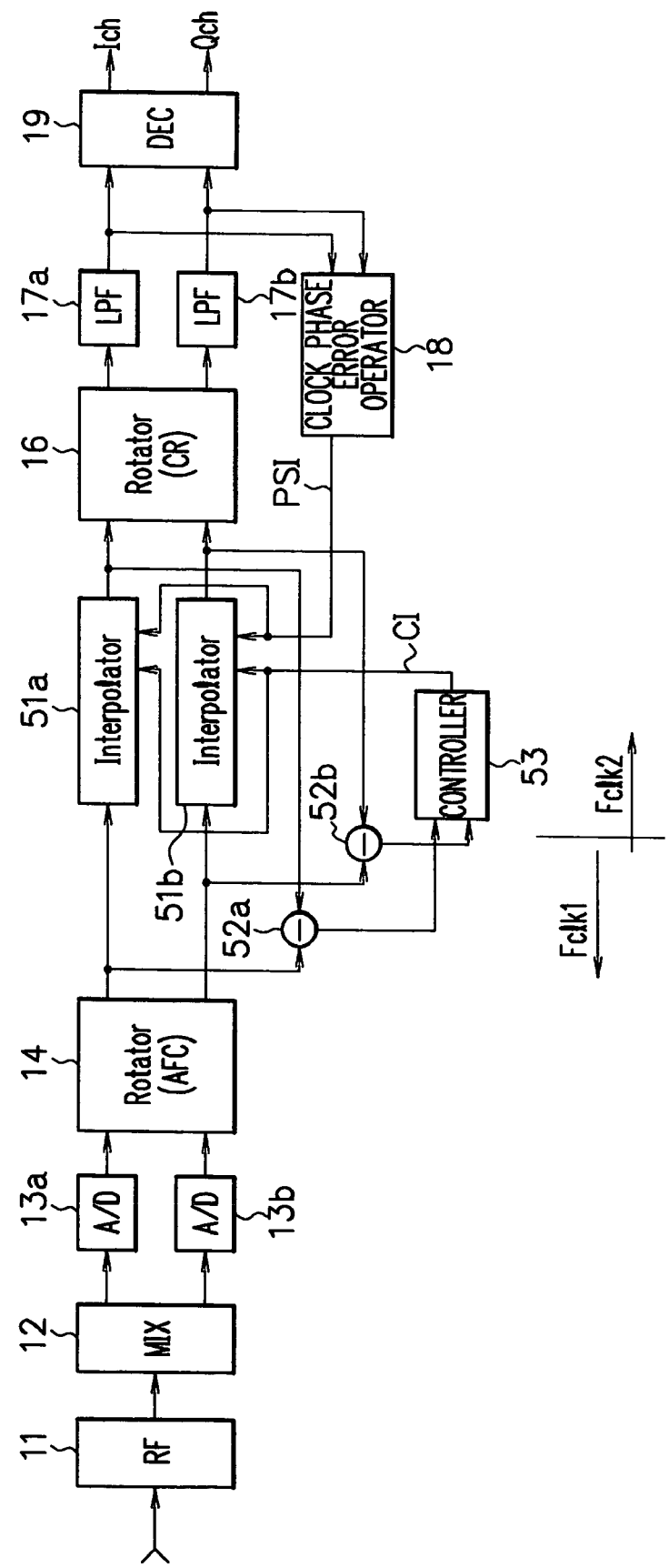
FIG. 5 is a block diagram showing an example of a configuration of a demodulator according to a third embodiment.

FIG. 5 is a block diagram showing an example of a configuration of a demodulator 50 according to the third embodiment. In FIG. 5, the blocks having functions being identical to those of the blocks shown in FIG. 1, are indicated by the same numbers/characters, so that the overlapped description will be omitted.

In FIG. 5, interpolators 51a and 51b are corresponding to the interpolators 15a and 15b shown in FIG. 1, and are configured as well as those in FIGS. 2A and 2B. The numeral 52a is a comparator (subtracter) where the base band signal inputted to the interpolator 51a and the base band signal outputted from the interpolator 51a are inputted, then the difference of them is outputted. As with the comparator (subtracter) 52b, the base band signal inputted to the interpolators 51b and the base band signal outputted from the interpolator 51b are inputted, then the difference of them is outputted. To a controller 53, outputs from the comparators 52a and 52b are inputted, and the controller 53 outputs control information CI on the basis of them to the interpolators 51a and 51b.

In this, if the influence which the signal of the adjacent channel affects the signal of receiving channel is little, the influence of the self-wave reduction with the carrier shift can be decreased by making the bandwidth (cut-off frequency) of the interpolators wide. For this reason, the demodulator 50 shown in FIG. 5 according to the third embodiment changes the bandwidth (cut-off frequency) of the interpolators 51a and 51b corresponding to the influence of the adjacent channel.

However, it is very difficult to directly measure the signal strength of the adjacent channel, in the demodulator 50 according to the third embodiment, the influence of the adjacent channel is detected by the difference between the front and back signal levels of the interpolators 51a and 51b. That is, by detecting the difference between the front and back signal levels (input and output) of the interpolators 51a and 51b with the comparators 52a and 52b, the noise component with the signal of the adjacent channel is detected. Then, on the basis of the detected result, the control information CI is outputted from the controller 53, and the bandwidth (cut-off frequency) of the interpolators 51a and 51b is controlled. In this way, the bandwidth (cut-off frequency) of the interpolators 51a and 51b is controlled by utilizing the difference between the front and back signal levels of the interpolators 51a and 51b.

Concretely, if the component of the adjacent channels is cut-off by the interpolators 51a and 51b, the difference between the front and back signal levels of these is little, so that it is possible to make the bandwidth (cut-off frequency) of the interpolators 51a and 51b wide. In contrary, if the difference between the front and back signal levels of the interpolators 51a and 51b is large, it is considered that the component of the adjacent channels is not cut-off, so that the control is changed to make the bandwidth (cut-off frequency) of the interpolators 51a and 51b narrow.

FIG. 6 is a block diagram showing a configuration of the controller 53 shown in FIG. 5.

In FIG. 6, the numeral 61 is an amplitude comparator which calculates the difference between the front and back signal levels of the interpolators 51a and 51b, and which is composed of the comparators 52a and 52b. The numeral 62 is a loop filter (LPF) which accumulates (integrates) outputs (comparison results of the signal levels) of the amplitude comparator 61. The numeral 63 is an evaluation unit which compares an output from the loop filter 62 with a previously setting threshold, and outputs control information C1 according to the comparison result. In addition, the number of previously setting threshold is arbitrary, if a plurality of thresholds are set, it is possible to finely control the bandwidth (cut-off frequency) of the interpolators 51a and 51b.

A Fourth Embodiment

Next, a fourth embodiment according to the present invention will be described.

Figure 7:
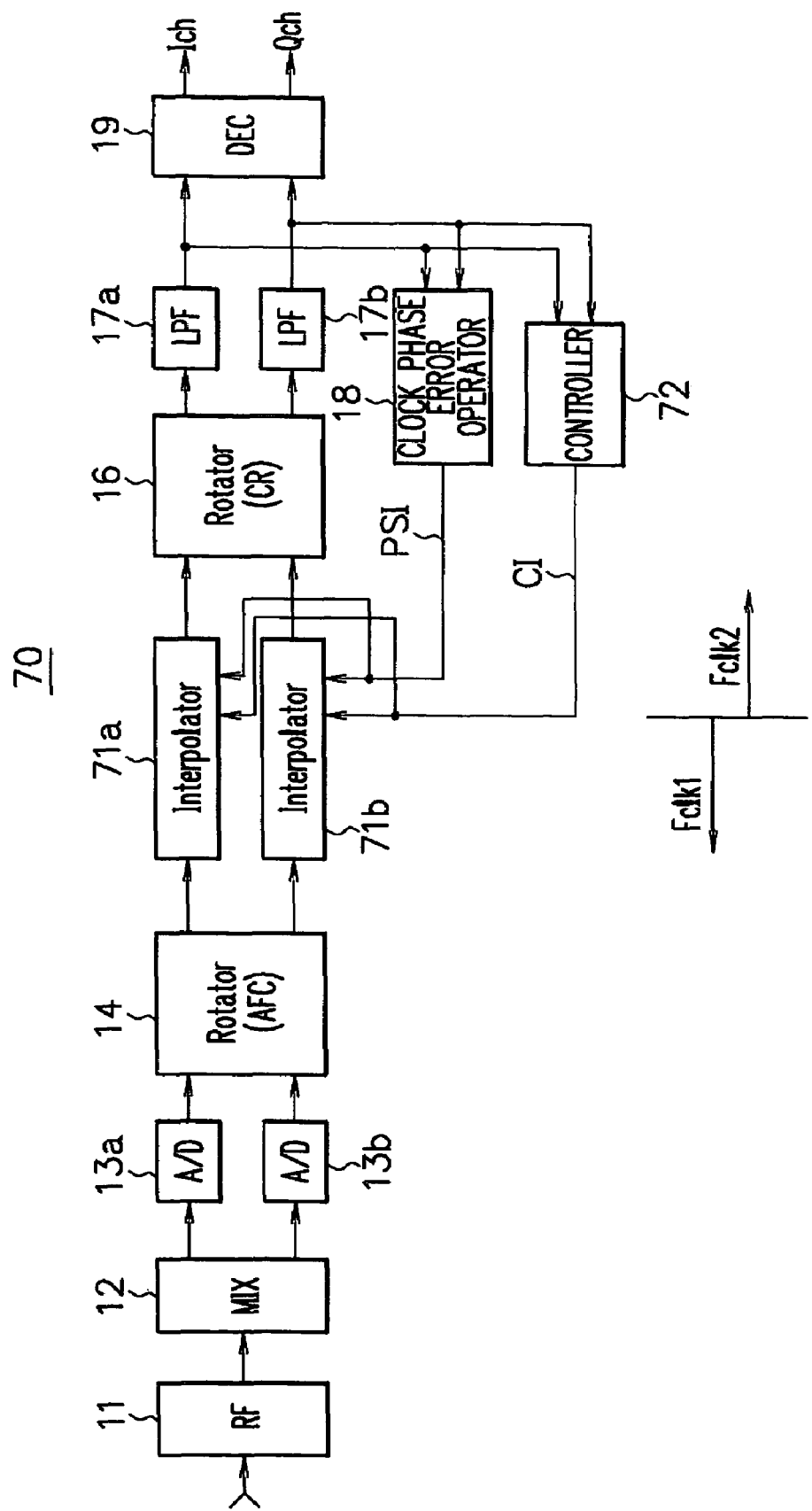
FIG. 7 is a block diagram showing an example of a configuration of a demodulator according to a fourth embodiment.

FIG. 7 is a block diagram showing an example of a configuration of a demodulator 70 according to the fourth embodiment. In FIG. 7, the blocks having functions being identical to those of the blocks shown in FIG. 1, are indicated by the same numbers/characters, so that the overlapped description will be omitted.

In FIG. 7, interpolators 71a and 71b are corresponding to the interpolators 15a, 15b shown in FIG. 1, and are configured as well as those in FIGS. 2A and 2B. The numeral 72 is a controller which outputs control information CI on the basis of signals outputted from the low pass filters 17a and 17b.

FIG. 8 is a block diagram showing a configuration of the controller 72 shown in FIG. 7.

In FIG. 8, the numeral 81 is an error calculator which calculates a distance between a signal point of a signal outputted from the low pass filters 17a and 17b and a basic signal point previously determined according to the modulation system, i.e. calculates an error. The numeral 82 is a loop filter (LPF) which accumulates (integrates) outputs from the error calculator 81, the numeral 83 is an evaluation unit which outputs control information CI according to the output from the loop filter 82.

That is, the controller 72 according to the fourth embodiment observes a constellation of the output signal from the low pass filters 17a and 17b, and outputs control information CI according to its result, and controls the bandwidth (cut-off frequency) of the interpolators 71a and 71b. Concretely, if the signal of the adjacent channel affects the signal of the receiving channel, since the error of the demodulating signal, which is calculated by the error calculator 81 where the constellation is inflated, becomes large, the controller 72 changes the bandwidth (cut-off frequency) of the interpolators 71a and 71b narrowly.

In addition, though the first to fourth embodiments are described individually, these may arbitrarily coordinate, so that the same effect can be obtained from the coordinating as that from each embodiment.

Further, the foregoing embodiments are only one example for performing the present invention concretely, and should not be intended to limit the technological scope. That is, the present invention can be provided as various alternative embodiments without departing from the technology spirit or main feature thereof.

According to the present invention, by changing the tap coefficients supplying to the FIR filter included in the interpolation processor according to the receiving signal, the filter band of the FIR filter can be set with the wider bandwidth than that of the receiving signal and with hard affect from the carrier shift in each receiving channel, and the filter bandwidth characteristic of the FIR filter can appropriately be controlled according to the receiving signal.

What is claimed is:

1. An apparatus for communications, comprising:
    a front processor for outputting a digital formatted base band signal with quadrature demodulating a modulated signal;
    an interpolation processor for interpolating to adjust a phase error corresponding to sampling timing on the basis of the base band signal outputted from said front processor and for creating and outputting a base band signal synchronized with said sampling timing; and
    a back processor for wave-shaping the base band signal outputted from said interpolation processor and for outputting;
    wherein said interpolation processor includes an FIR filter and controls tap coefficients which are supplied to said FIR filter on the basis of said modulated signal inputted therein, and
    wherein the apparatus changes the tap coefficients which are supplied to said FIR filter according to a signal bandwidth of said modulated signal.

2. The apparatus for communications according to claim 1, wherein said interpolation processor further comprises a coefficient operator which outputs tap coefficients according to said modulated signal to said FIR filter.

3. The apparatus for communications according to claim 2, wherein said coefficient operator comprises a plurality of coefficient memories which store said tap coefficients, and a selector which selects one coefficient memory among said plurality of coefficient memories according to said modulated signal.

4. The apparatus for communications according to claim 1, wherein the apparatus informs the signal bandwidth of said modulated signal on the basis of symbol rate information of said modulated signal.

5. The apparatus for communications according to claim 4, wherein said symbol rate information is a symbol frequency set signal of said modulated signal.

6. The apparatus for communications according to claim 1, wherein the apparatus supplies tap coefficients which set a filter bandwidth being wider by a constant number of frequencies than that of said modulated signal according to the signal bandwidth of said modulated signal to said FIR filter.

7. The apparatus for communications according to claim 1, wherein the apparatus supplies tap coefficients which set a filter bandwidth being wider by a constant ratio than that of said modulated signal according to the signal bandwidth of said modulated signal to said FIR filter.

8. The apparatus for communications according to claim 1, wherein the apparatus supplies tap coefficients which set a filter bandwidth being wider by k times (k is an arbitrary value greater than or equal to 1) than that of said modulated signal according to the signal bandwidth of said modulated signal to said FIR filter.

9. The apparatus for communications according to claim 1, wherein the apparatus changes tap coefficients which are supplied to said FIR filter according to a multi-value relating to multi-value modulation of said modulated signal.

10. The apparatus for communications according to claim 9, wherein the apparatus controls tap coefficients which are supplied to said FIR filter for the sake of the filter bandwidth of said FIR filter being inversely proportional to the multi-value of said modulated signal.

11. The apparatus for communications according to claim 10, wherein the apparatus changes tap coefficients which are supplied to said FIR filter, with making the filter bandwidth of said FIR filter narrow if the multi-value of said modulated signal is large; with making it wide if that is small.

12. The apparatus for communications according to claim 9, wherein the apparatus informs the multi-value of said modulated signal by using a multi-value set signal of said modulated signal.

13. The apparatus for communications according to claim 1, wherein the apparatus changes tap coefficients which are supplied to said FIR filter according to a signal level of an adjacent channel to said modulated signal.

14. The apparatus for communications according to claim 13, wherein the apparatus detects the signal level of said adjacent channel on the basis of difference between an input level and an output level to and from said FIR filter.

15. The apparatus for communications according to claim 14, further comprising:
 a comparator which calculates difference between the input level and the output level to and from said FIR filter;
 a loop filter which integrates outputs of said comparator; and
 a control circuit which outputs control information for controlling tap coefficients which are supplied to said FIR filter on the basis of the output of said loop filter.

16. The apparatus for communications according to claim 13, wherein the apparatus detects the signal level of said adjacent channel on the basis of the constellation of a signal outputted from said back processor.

17. The apparatus for communications according to claim 16, further comprising:
 an operator which calculates difference between a signal point of a signal outputted from said back processor and a predetermined reference signal point;
 a loop filter which integrates outputs of said operator; and
 a control circuit which outputs control information for controlling tap coefficients which are supplied to said FIR filter on the basis of the output of said loop filter.

* * * * *